Patented May 16, 1944

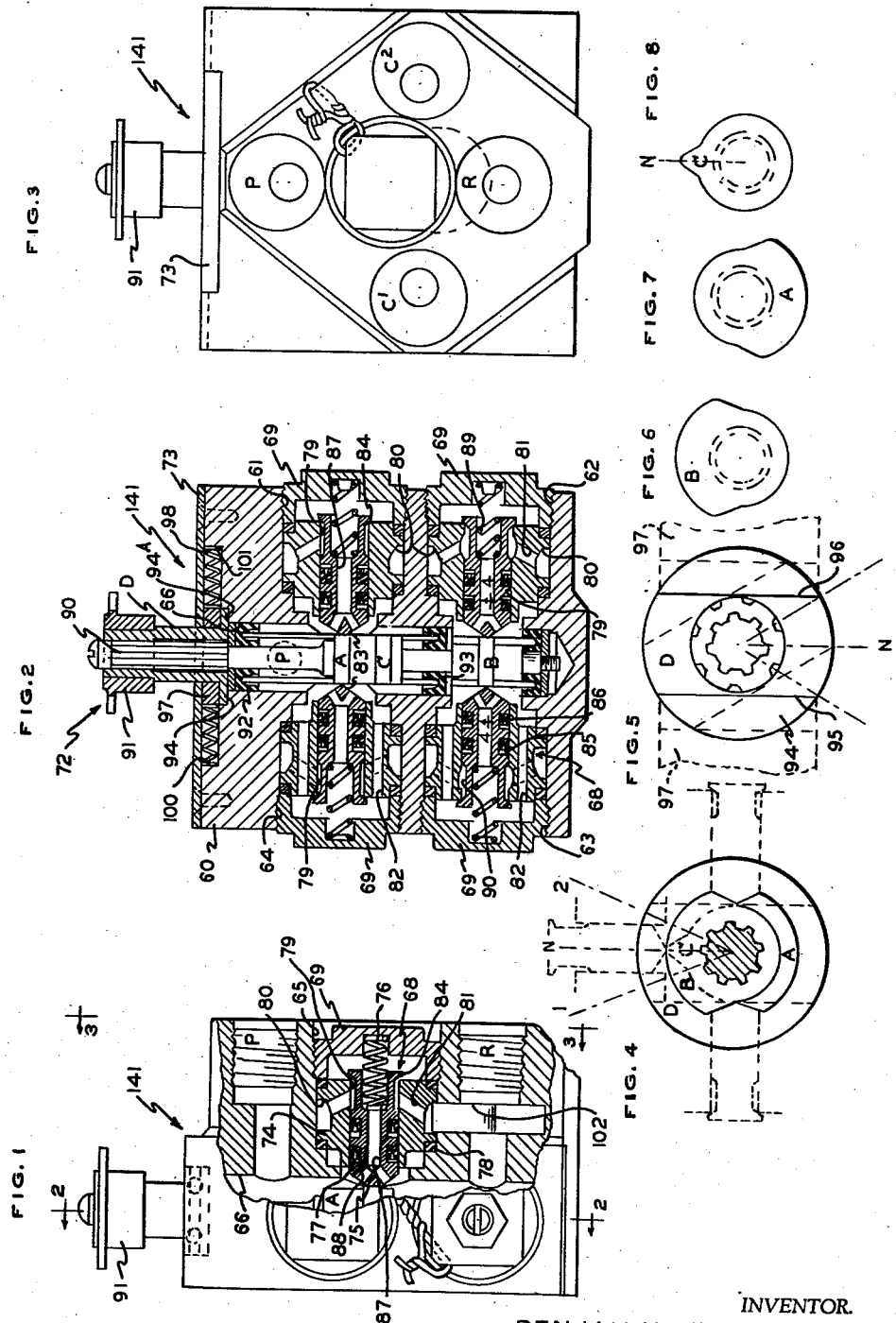

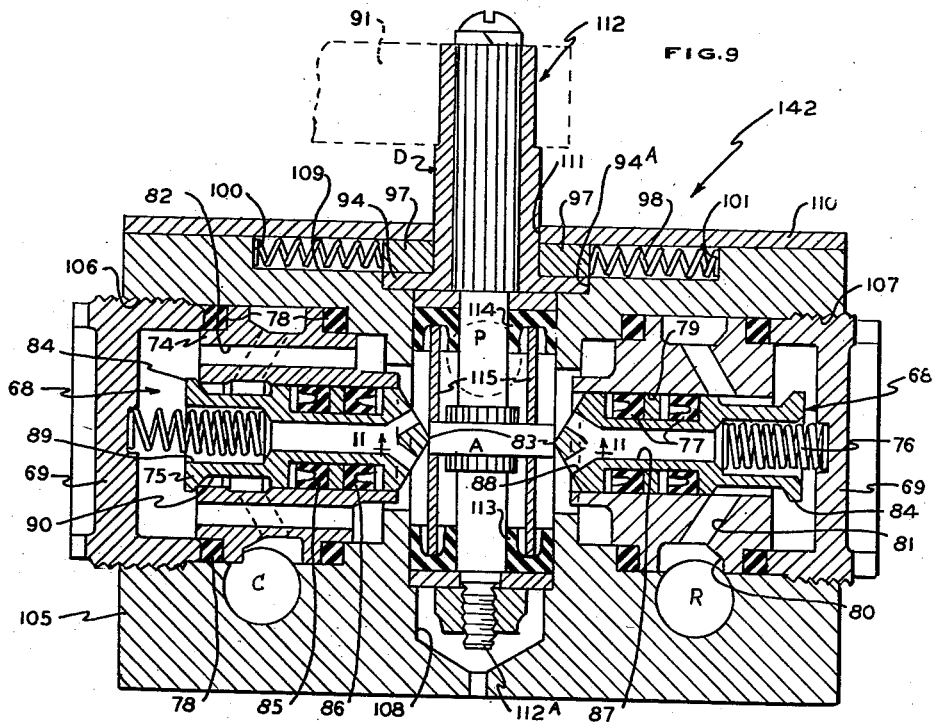
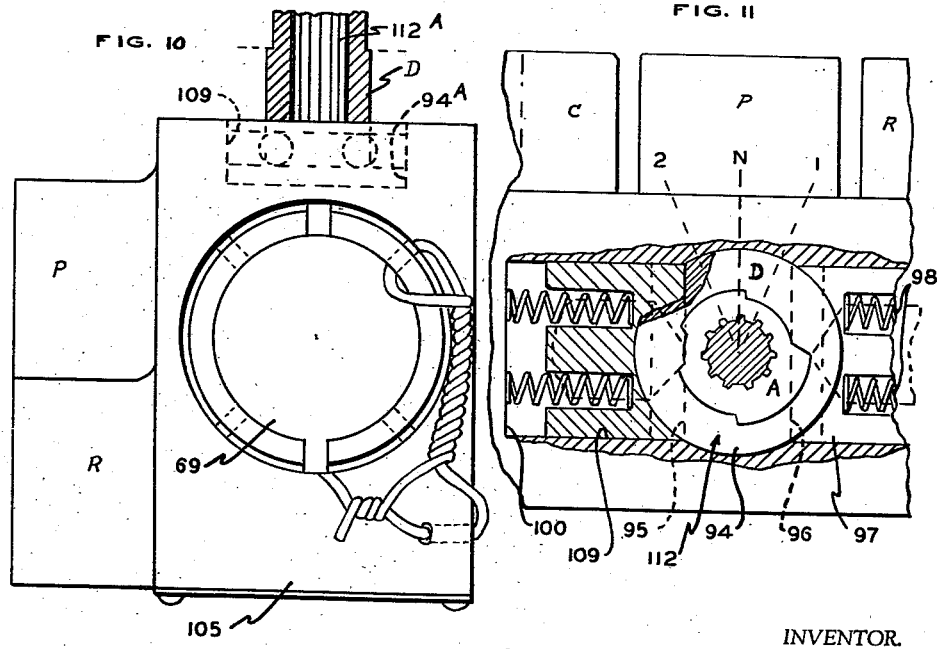

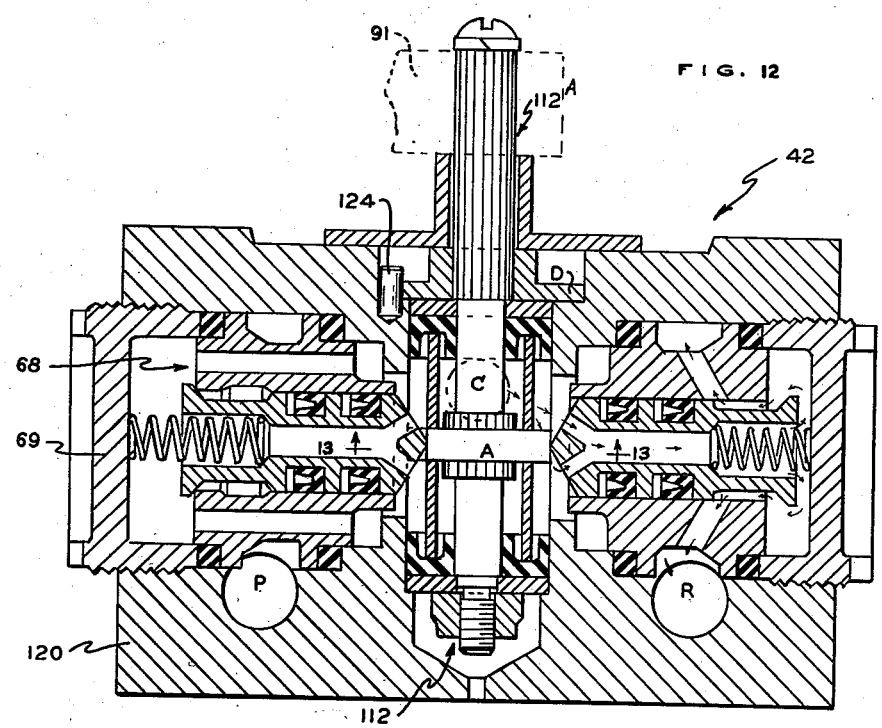
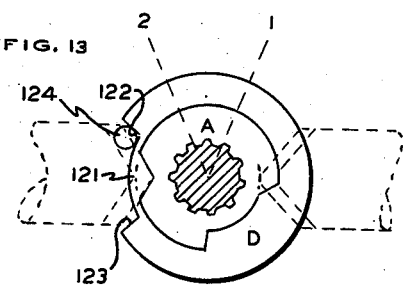

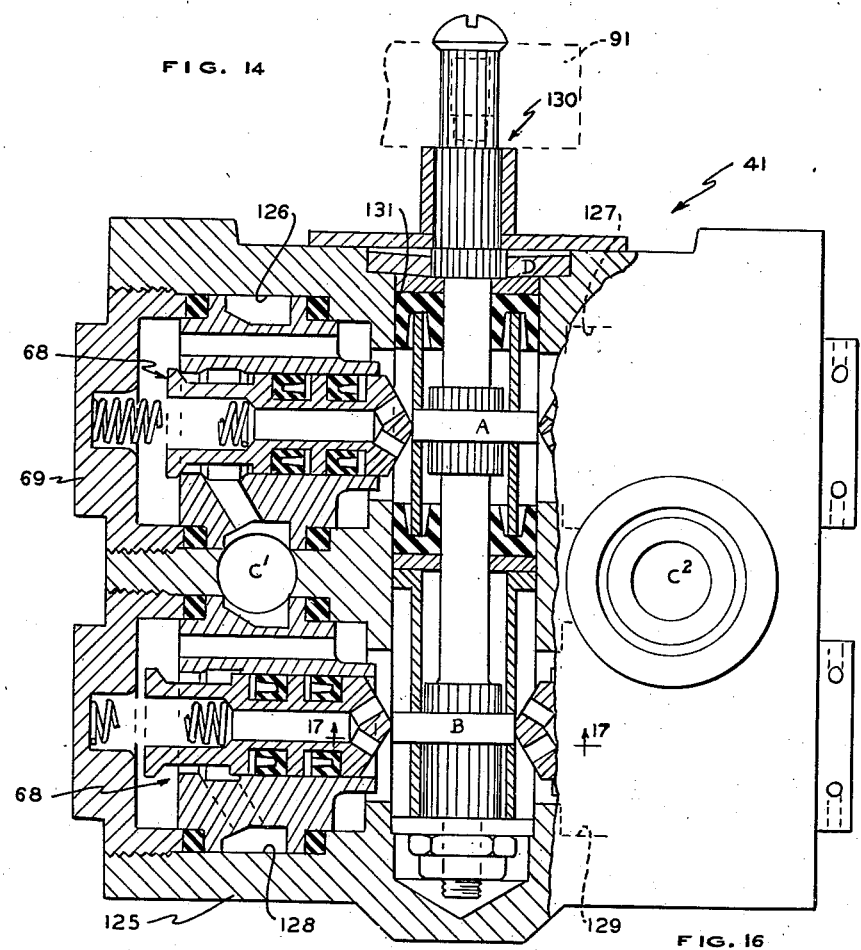
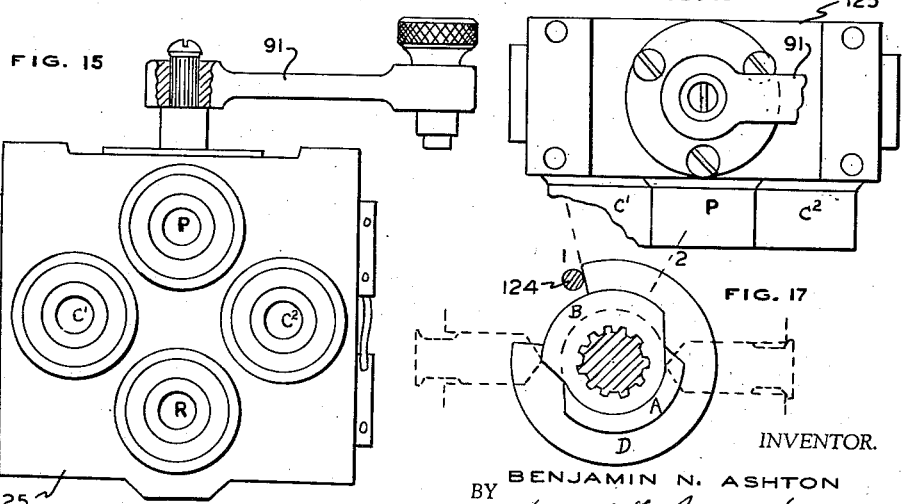

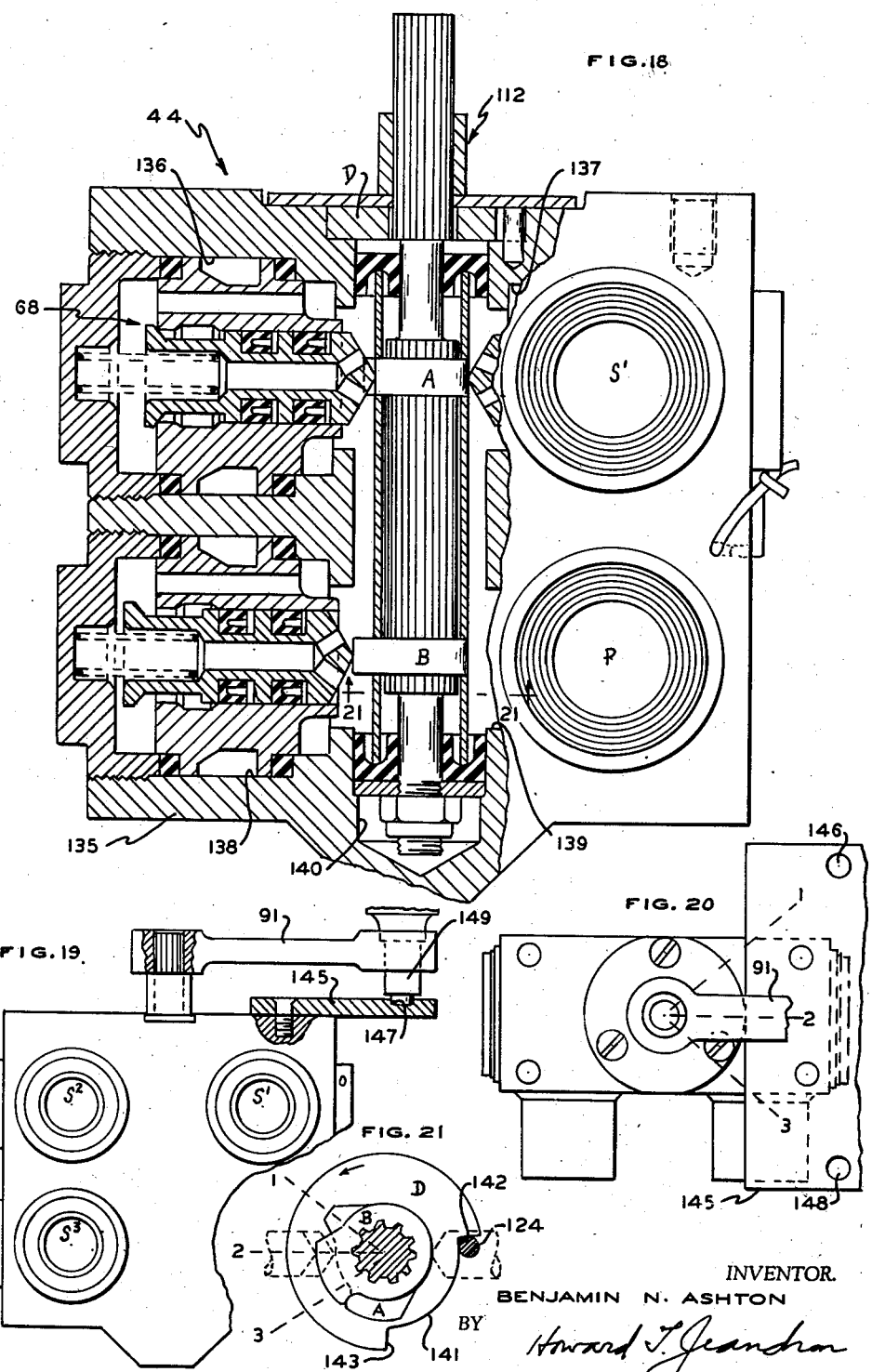

2,349,069

UNITED STATES PATENT OFFICE 2,349,069

HYDRAULIC PRESSURE CONTROL VALVE UNIT

Benjamin N. Ashton, Kingston, N. Y., assignor to Electrol Incorporated, Kingston, N. Y., a corporation of Delaware Application January 9, 1942, Serial No. 426,260

14 Claims. (Cl. 251—132)

This invention relates generally to valves and more particularly to cam actuated poppet valves.

One of the objects of the present invention is to provide a valve with a pressure balanced piston.

Another object is to provide a fluid valve which seals equally well at high or low temperatures and is not affected by expansion or contraction at the poppet seat.

A further object is to provide a fluid flow control valve which operates with no leakage with either high or low pressure fluid flow.

A still further object is to provide a fluid flow control valve which not only requires a small handle load for controlling low pressure, but also requires the same small handle load for controlling high pressures.

Another object is to provide a fluid flow control valve which not only seals effectively to maintain the pressure supplied but, in addition, provides a pressure relief escape for dangerously high pressure fluid flow.

A still further object is to provide a symmetrically constructed valve which permits interchangeable installation.

A further object is to provide a poppet valve with a cam operating control which has a self centering spring to automatically return the valve to a neutral position.

A still further object is to provide a hydraulic valve of the poppet type in which the poppets are arranged in opposed relationships to be actuated by the same cam.

A still further object is to provide a hydraulic valve of the poppet type in which the poppets are mounted separately in the casing, permitting quick and easy installation, maintenance, and adjustment.

Other general objects of the present invention are the provision of a poppet type valve which is light in weight, simple and compact in structure, balanced in operation, and leak-proof during use.

Other objects and characteristic features of the invention will appear from the following detailed description of one embodiment thereof, taken in connection with the accompanying drawings wherein the same reference numerals are appended to identical parts in the several figures, and in which:

Fig. 1 is a front elevational view of a line selector valve, partially in cross sectional view, Fig. 2 is a view taken on line 2—2 of Fig. 1, Fig. 3 is a side elevational view taken on line 3—3 of Fig. 1, Fig. 4 is a plan view of the actuating cams taken on line 4—4 of Fig. 2, Fig. 5 is a plan view of the spring centered cam, Fig. 6 is a plan view of the cam for operating one pair of poppet valves, Fig. 7 is a plan view of the cam for operating the other pair of poppet valves, Fig. 8 is a plan view of the cam for opening the by-pass valve, Fig. 9 is a cross sectional view of a three-position selector valve enlarged to double size, Fig. 10 is an end elevational view of the selector valve, Fig. 11 is a plan view of the actuating cams for the poppet valves, and the spring centered cam unit, taken on line 11—11 of Fig. 9, Fig. 12 is a cross sectional view of a two position selector valve enlarged to double size, Fig. 13 is a plan view of the actuating and stop cams for the poppet valves, taken on line 13—13 of Fig. 12, Fig. 14 is an enlarged elevational view taken partially in cross section of a line selector valve, Fig. 15 is a full size front elevational view of the line selector valve, Fig. 16 is a top plan view of the line selector valve, Fig. 17 is a plan view of the actuating and stop cams taken on line 17—17 of Fig. 14, Fig. 18 is an enlarged elevational view partially in cross section of a three position selector valve, Fig. 19 is a full size front elevational view of the three position selector valve, Fig. 20 is a top plan view of the three position selector valve, and Fig. 21 is a plan view of the actuating and stop cams taken on line 21—21 of Fig. 18.

The present embodiment is provided with three typical valves, each one comprised of the same individual poppets with cam actuating means, but grouped according to the particular application. The apparatus of the invention thus provides simple, durable, and reliable means for controlling extremely high fluid pressures that are necessary to properly operate the functions of the hydraulic system of an airplane.

A typical form of valve is shown in Figures 1, 2 and 3 wherein there are illustrated various views of the line selector valve 141, which is comprised of a casing 60 having six bores 61—66 and four ports P, R, $C^1$ and $C^2$ therein. In the bores 61—65 there are poppet valve assemblies 68 mounted therein and threadably secured. The assemblies 68 in bores 61—65 are secured by a solid plug 69. The bore 66 has a cam actuating shaft 72 mounted therein, and secured in place by a bolted plate 73. The poppet valve assembly 68 comprises a valve seat member 74, a plunger member 75 and a spring 76, with U-cup seals 77 on the plunger, and ring seats 78 on the seat member. The seat member 74 is made to fit the bores 61—65 of the casing 60, and in structure comprises a central bore 79 of the same diameter as the plunger 75, and in addition there is formed a peripheral groove 80 with small borings 81 between the groove 80 and the central bore 79. There is also provided small bores 82 running transversely through sections of the seat member 74. The plunger 75 is formed to fit snugly in the bore 79 of the seat member 74, and in addition has a contact point 83 at one end thereof and an enlarged conically formed head 84 at the opposite end. The plunger 75 is provided with two peripheral grooves, 85 and 86, in which the U-cups 77 are fitted to give a sealing action for the fluid under pressure. The plunger 75 also is formed with a hollow center 87, communicating with the contact point 83 by a plurality of holes 88, and communicating with the opposite end through an enlarged spring retaining open end 89. There is also provided a peripheral groove 90 on the valve head end 84. In assembly the U-cups 77 are positioned, as indicated in Figs. 1, 2 and 3, in the grooves 85 and 86 and the spring 76 is inserted in the spring retaining end 89. The plunger is then inserted in the bore 79 of the seat member 74, the seals 78 are placed on this member and the whole assembly 68 is inserted in a bore, such as 61. The plug 69 is then screwed down upon the assembly until a good tight seal is assured. Each valve assembly 68 is inserted and secured in the same manner. The cam actuating shaft 72 comprises a shaft center 90 having cams A, B, C and D affixed thereto, which are more clearly defined in Figs. 4–8.

The shaft 72 also has seals 92 and 93 which permit the sealing of the pressure around the shaft in the bore 66. The shaft 72 is inserted in the bore 66 with the cams and seals in the relationship illustrated in Fig. 2, and in addition a handle 91 is affixed to the cam D. The cam D is provided to insure a centering arrangement to keep the valve in a neutral position. The cam D is affixed to the shaft 90 and is provided with a circular bottom flange 94 which fits into a space 94A in the casing 60 which is the same shape and size as the flange 94. The cam D is also provided with two flat faces 95 and 96 against which a centering spring holder 97 (shown in Fig. 11) is pressed by the springs 98. The spring holder 97 is slidably retained in the position indicated in Fig. 2 by the plate 73, and movement of the holder 97 is limited by the shoulders 100 and 101. Rotation of the cam D is limited to the amount indicated in dotted lines in Fig. 5 as the spring holders 97 will be forced up against the shoulders 100 and 101. When the handle 91 is released the springs 98 will return the cam D and, therefore, handle 91 to its neutral position. The relationship in which the valve poppets are actuated in operation may best be followed by reference to the Figs. 4, 6, 7 and 8. In a neutral position all poppets are closed as shown in Fig. 2 while the C cam holds the poppet illustrated in Figs. 1 and 4 in an open position, thus permitting the flow of fluid in the P port to the bore 66, then out through the perforations 88, the hollow center 87, around the head 84 of the plunger 75, through the valve seat 74 and perforations 81 to the peripheral groove 80 and thus through the passage 102 to the port R, where the fluid passes on into the line leading away from this valve.

In an operated position marked #1 in Fig. 4, the C cam will permit the poppet illustrated in Fig. 1 to be closed, whereas the A and B cams will be rotated counter-clockwise. This movement translated to Fig. 2 causes the poppets in the bores 63 and 61 to be opened. With these poppets open and all others closed the fluid entering the P port will pass through the poppet structure in the bore 61 and around the open poppet and out the port $C^2$ which is connected to the peripheral groove 80. Likewise, the fluid being exhausted will pass through the $C^1$ port around the open poppet in the bore 63 and out the R port. In the opposite position marked #2 in Fig. 4 the C cam permits the free return poppet to be closed, whereas the A and B cams will be rotated clockwise. This movement translated to Fig. 2 causes the poppets in the bores 62 and 64 to be opened. With these poppets open and all others closed, the fluid from the port P will pass around the poppet structure in the bore 64 and out the port $C^1$, while the fluid being exhausted will pass through the $C^2$ port around the open poppet, in the bore 62 and out the R port.

Referring next to Fig. 9, which illustrates a three position selector valve 142 wherein the same spring centering parts are incorporated to normally position the valve in neutral, there is provided a casing 105, having three bores 106, 107 and 108, and having three ports, pressure P, cylinder C, and return R, therein. Also mounted in a recessed portion 109 is the neutral positioning unit comprised of four springs 98, two slidable spring holders 97, and the D cam with its handle 91 and its two flat faces 95 and 96. To keep the neutralizing unit in proper relationship, a cover plate 110 is affixed to the casing 105, and is provided with an opening 111 for the D cam shank to pass through. The shaft assembly 112 is mounted in the bore 108 and in addition to the D cam mounted on the upper end thereof, there is an A cam mounted about midway on a shaft 112A to cooperate with the two poppet valves. The shaft 112A is also provided with U-cup seals 113 and 114 and retainers 115, so that when the assembly 112 is mounted in the bore 108 the fluid under pressure may be sealed. Mounted in the bores 106 and 107 are the poppet assemblies 68, which are positioned and sealed in their respective bores by the plugs 69. The poppet assemblies 68 are identical and are comprised of a valve seat member 74 with two sealing rings 78 and a plunger 75 and a spring 76. The plunger 75 has two U-cup seals 77 mounted thereon. The seat member 74 is made to fit the bores 106 and 107 of the casing 105 and in structure comprise a central bore 79 of the same diameter as the plunger 75, and in addition there is formed a peripheral groove 80 with small borings 81 between the groove 80 and the central bore 79. There is also provided small bores 82 running transversely through sections of the seat member 74. The plunger 75 is formed to fit snugly in the bore 79 of the seat member 74, and in addition has a contact point 83 at one end thereof and an enlarged conically formed head 84 at the opposite end. The plunger 75 is provided with two peripheral grooves 85 and 86 in which the U-cups 77 are fitted to give a sealing action for the fluid under pressure. The plunger 75 also is formed with a hollow center 87, communicating with the contact point 83 by a plurality of perforations 88, and communicating with the opposite end through an enlarged spring retaining open end 89. There is also provided a peripheral groove 90 in the valve head end 84. In assembly the U-cups 77 are positioned as indicated in Fig. 9 in the grooves 85 and 86 and the spring 76 is inserted in the spring retaining end 89. The plunger is then inserted in the bore 79 of the seat members 74, the seals 78 are placed on this member and the whole assembly 68 is inserted in the bore 106. The plug 69 is then screwed down upon the assembly until a good tight seal is assured. The other valve assembly 68 for this unit is inserted and secured in the bore 107 in the same manner.

The cams A and D of the shaft assembly 112 are more clearly defined in Fig. 11. The cam D is provided to insure a centering means to keep the valve in a neutral position. The cam D is affixed to the shaft 112A and is provided with a circular bottom flange 94 which fits into a space 94A in the casing 105 which is the same shape and size as the flange 94. The cam D is provided with the two flat faces 95 and 96 against which a centering spring holder 97 is pressed by the springs 98. The spring holder 97 is slidably retained in the position indicated in Fig. 9 by the plate 110, and movement of the holder 97 is limited by the shoulders 100 and 101. Rotation of the cam D is limited to the position indicated in dotted lines in Fig. 11 as the spring holders 97 will be forced up against the shoulders 100 and 101. When the handle 91 is released, the springs 98 will return the cam D and, therefore, handle 91 to its neutral position. The relationship in which the valve poppets are actuated in operation may be best be followed by reference to the Figs. 9 and 11. In a neutral position the right hand poppet is open as shown in the figures, while the left hand poppet is closed; thus the flow of fluid under pressure in the port P will pass through the perforations 88, the hollow center 87, around the head 84, and also from the bore 108 through the small bores 82, around the head 84, passing in the bore 79 through the peripheral groove 90 and small borings 81 to the peripheral groove 80 and out the port R, which is connected thereto. In the position marked #1, Fig. 11, the right hand poppet is closed and the left hand poppet is open so that in the same manner the fluid flows from the port P around the poppet and out the port C. In the position marked #2 the right hand poppet leading to the port R is wide open, while the left hand poppet is slightly open; thus the fluid flow from the port P will pass to the port R and at the same time, any flow from the port C will be carried with the flow to the port R.

Referring next to Figs. 12 and 13, there is illustrated a three port, two position selector valve 42 having a two position stop cam D and a cam A. The structure is comprised of a casing 120, a cam stop and actuating assembly 112, with an actuating handle 91, and two poppet valve assemblies 68 secured by plugs 69. The stop cam D is provided with a cut out area 121 which provides two stop shoulders 122 and 123. In operation a stop pin 124 mounted in the casing 120 provides a stop for the cam D so that its movement is limited to the span of the cut out area 121. In operation there are two positions. The handle 91 affixed to the shaft 112A, when placed in position #1 as illustrated in Fig. 13, will force the right hand poppet valve open and allow the left hand valve to close; thus, the pressure port will be stopped and the cylinder port C will be connected to the return port R allowing any exhaust fluid to be passed therethrough. When the handle 91 is moved to position #2, the left hand poppet valve will be opened and the right hand poppet valve will be closed. Thus, the fluid under pressure will pass through the poppet valve and out the cylinder port C.

Referring next to Figs. 14–17, there is illustrated a four port, two position line selector valve 41 which is similar to the valve 141 already disclosed, but differs in that there is no neutral position. Therefore, there is no centering device and the by-passing poppet for neutral position is eliminated. The valve comprises a casing 125, having four ports, pressure P, return R, and cylinder $C^1$ and $C^2$, as well as four poppet valves 68 mounted in bores 126, 127, 128 and 129 and a stop and cam actuating assembly 130 mounted in a bore 131, similar to the structure described for the valve 141, and controlled by a handle 91. The valve in operation may be moved to either of the two stop positions indicated in dotted lines in Fig. 17, and stopped by the pin 124, and, as in the valve 141, the position #1 will open two poppet valves and close two poppet valves; thus the port P will be connected to the port $C^2$ while the port $C^1$ will be connected to the port R. The movement of the handle to the other position #2 will reverse these connections, so that port P will be connected to port $C^1$ and port $C^2$ will be connected to the port R.

Referring to Figs. 18, 19, 20 and 21, there is illustrated a three position, four port selector valve 44, which is similar to the valve 41, but differs in that there are only three poppet valves 68 used and the cams A and B differ in shape. The valve comprises a casing 135 having four ports, pressure P, system $S^1$, system $S^2$, system $S^3$, as well as three poppet valves 68, and four bores 136, 137, 138 and 139 and a stop cam D and actuating cam assembly 112 mounted in a bore 140, which is controlled by a handle 91, which is provided with a spring retained detent 149. There is also provided a detent positioning plate 145, with three positions 146, 147, and 148 defined in Figs. 19 and 20. The valve in operation may be moved to any one of three positions as indicated in Figs. 20 and 21. In the position #1 the B cam will hold the left hand lower poppet open, as shown in Fig. 18, while the remaining poppets are closed. Thus the fluid under pressure will flow from the port P through the bores 139 and 140 and out this poppet to the port $S^3$. In the same fashion, when moved to position #2 the A cam will hold the upper left hand poppet open, while the remaining poppets are closed; thus the fluid under pressure will flow from the port P through the bores 139 and 140, and out this poppet to the port $S^2$. Also, in the same fashion, when the valve is in position #3 the A cam will hold the upper right hand poppet open, while the remaining poppets are closed. Thus the fluid under pressure will flow from the port P through the bores 139 and 140 and out this poppet to the port $S^1$. The stop cam D is provided with a cut out section 141 having shoulders 142 and 143, which abut against the stop pin 124.

While the invention has been illustrated as applied to the series of specifically disclosed and described valve constructions, it will be understood that it is equally applicable to other forms of valves than those disclosed herein. Therefore, the forms of the valves disclosed should be considered as illustrative of the invention and not as limiting the scope of the following claim.

What is claimed is:

1. In a hydraulic valve a poppet valve which is comprised of a hollow center seat member and a plunger which fits within the hollow center, said plunger also being provided with a hollow center, said seat member having drilled holes to permit the passage of fluid from end to end, also being formed to provide a peripheral groove and drilled between the groove and hollow center, said plunger being formed with a large conical head which abuts the valve seat member and a piston like body which fits the hollow center of the seat member and is also provided with an abutting point at the end of the plunger opposite the head end, the abutting point being provided with perforations communicating with the hollow center of the plunger to pass fluid therethrough, a spring mounted in the head of the plunger so that normally the valve head is held against the valve seat member, means to pass fluid under pressure from one side of the poppet valve and seal the fluid with the spring pressed plunger, means employing said perforations and hollow center under the control of the abutting point to pass fluid under pressure from one side of the poppet valve thereby to the opposite side through the open valve seat member to the hollow center of said seat member and on through the drilled holes to the peripheral groove of the seat member.

2. A valve comprising a seat member having a substantially uniform central bore therethrough; a plunger slidable in said bore having a conical head portion adapted to abut said seat member in sealing engagement therewith, a piston-like body portion fitting said bore and a reduced portion intermediate said head and body portions forming a chamber with said bore, said seat member having an external peripheral groove and a passageway connecting said groove with said chamber, the end of said body portion forming an abutment end opposite said head and projecting from said bore; means urging said head against said seat, means adjacent one end of said seat for receiving fluid under pressure, at least one passage in each of said plunger and said seat member for conducting fluid between the opposite ends of said seat and plunger and for subjecting the opposite ends of said plunger to substantially equal pressures, said plunger being movable in opposition to said urging means to provide for fluid flow from outwardly of said head into said chamber and through said passageway to said peripheral groove.

3. A valve comprising a valve casing having an inlet passage and a pair of spaced apart outlet passages, a first bore extending at least partially through said casing and communicating with said inlet passage, a second bore extending through said casing and intersecting said first bore at substantially a right angle, said second bore communicating with said discharge passages adjacent its opposite ends, tubular sleeves detachably mounted within the opposite ends of said second bore and having passages therethrough connecting the interiors of each sleeve with a separate discharge passage, means closing opposite ends of said second bore and forming chambers adjacent the outer ends of said sleeves, poppet valves slidably mounted within said sleeves having valve heads at their outer ends and inner ends adjacent said first bore, means urging the said poppet valves inwardly to seat the valve heads against the outer ends of said sleeves, means connecting said chambers with said first bore to permit fluid to flow from said inlet into said chambers to maintain substantially equal pressures on opposite ends of said poppet valves, and cam means within said first bore for selectively unseating said poppet valves individually and simultaneously to permit fluid to flow from said chambers past the valve heads, through the passages in said sleeve to said discharge passages.

4. A valve comprising a valve casing having an inlet passage and a pair of spaced apart outlet passages, a first bore extending at least partially through said casing and communicating with said inlet passage, a second bore communicating with said discharge passages adjacent its opposite ends, tubular sleeves detachably mounted within the opposite ends of said second bore and having passages therethrough connecting the interiors of each sleeve with a separate discharge passage, means closing opposite ends of said second bore and forming chambers adjacent the outer ends of said sleeves, poppet valves slidably mounted within said sleeves having valve heads at their outer ends and inner ends adjacent said first bore, means urging the said poppet valves inwardly to seat the valve heads against the outer ends of said sleeves, means in said sleeves connecting said chambers with said first bore to permit fluid to flow from said inlet into said chambers to maintain substantially equal pressures on opposite ends of said poppet valves, and cam means within said first bore for selectively unseating said poppet valves individually and simultaneously to permit fluid to flow from said chambers past the valve heads, through the passages in said sleeves to said discharge passages.

5. A valve comprising a valve casing having an inlet passage and a pair of spaced apart outlet passages, a first bore extending at least partially through said casing and communicating with said inlet passage, a second bore extending through said casing and intersecting said first bore at substantially a right angle, said second bore communicating with said discharge passages adjacent its opposite ends, tubular sleeves detachably mounted within the opposite ends of said second bore and having passages therethrough connecting the interiors of each sleeve with a separate discharge passage, means closing opposite ends of said second bore and forming chambers adjacent the outer ends of said sleeves, tubular poppet valves slidably mounted within said sleeves having valve heads at their outer ends and inner ends adjacent said first bore, means urging the said poppet valves inwardly to seat the valve heads against the outer ends of said sleeves, and cam means within said first bore for selectively unseating said poppet valves individually and simultaneously to permit fluid to flow from said chambers past the valve heads, through the passages in said sleeve to said discharge passages.

6. A valve comprising a valve casing having substantially coaxial, communicating bores extending inwardly from opposite sides thereof, means for delivering fluid under pressure to the inner ends of said bores, means forming fluid discharge passages communicating with said bores outwardly of said fluid delivery means, a sleeve in each of said bores overlying a discharge passage and having a passage connecting the interior of said sleeve with said discharge passage, means closing the outer end of each bore and forming chambers disposed outwardly of each sleeve, a valve member slidably mounted in each sleeve, each valve member having a valve head adapted to seat against the outer end of its corresponding sleeve, means urging said valve members toward seating position, means for delivering fluid from the inner ends of said bores to said chambers, and a three position cam member having cam faces for unseating the valve heads individually and simultaneously to permit fluid to flow from said delivering means selectively to one or both of said discharge passages.

7. A valve comprising a valve casing having substantially coaxial, communicating bores extending inwardly from opposite sides thereof, means for delivering fluid under pressure to the inner ends of said bores, means forming fluid discharge passages communicating with said bores outwardly of said fluid delivery means, a sleeve in each of said bores overlying a discharge passage and having a passage connecting the interior of said sleeve with said discharge passage, means closing the outer end of each bore and forming chambers disposed outwardly of each sleeve, a valve member slidably mounted in each sleeve, each valve member having a valve head adapted to seat against the outer end of its corresponding sleeve, means urging said valve members toward seating position, means including longitudinal passages through said sleeves for delivering fluid from the inner ends of said bores to said chambers, and a three position cam member having cam faces for unseating the valve heads individually and simultaneously to permit fluid to flow from said delivering means selectively to one or both of said discharge passages.

8. A valve comprising a valve casing having substantially coaxial, communicating bores extending inwardly from opposite sides thereof, means for delivering fluid under pressure to the inner ends of said bores, means forming fluid discharge passages communicating with said bores outwardly of said fluid delivery means, a sleeve in each of said bores overlying a discharge passage and having a passage connecting the interior of said sleeve with said discharge passage, means closing the outer end of each bore and forming a chamber, disposed outwardly of each sleeve, a valve member slidably mounted in each sleeve, each valve member having a valve head adapted to seat against the outer end of its corresponding sleeve, means urging said valve members toward seating position, means for delivering fluid from the inner ends of said bores to said chambers, a three position cam member having cam faces for unseating the valve heads individually and simultaneously to permit fluid to flow from said delivering means selectively to one or both of said discharge passages, and means for normally urging said cam means to a position for unseating only one of said valve heads.

9. A valve comprising a valve casing having an inlet port, a pair of substantially coaxial valve chambers each having a valve seat therein, and discharge ports communicating with said valve chambers; poppet valve members slidable in said valve chambers into and out of engagement with said seats for connecting and disconnecting said chambers from their respective discharge ports; means normally urging said valve members inwardly toward said seats; means connecting said inlet port to said chambers; cam means interposed between and engaging the inner ends of said valve members, said cam means being formed to displace both of said valve members from their seats in one position, to displace one of said valve members, only, from its seat in another position, and to displace the other of said valve members, only, from its seat in another position; and means for supplying fluid pressure from said inlet to said inner ends of said valve members to balance said valve members hydraulically.

10. A valve comprising a valve casing having a first chamber, a fluid inlet port communicating with said first chamber, second and third chambers disposed on opposite sides of said first chamber and extending substantially perpendicular thereto, a sleeve member having a valve seat at its outer end in each of said second and third chambers, a discharge passage communicating with the interiors of each of said sleeve members intermediate its ends, a poppet valve slidable in each of said sleeve members, having valve heads at their outer ends cooperating with said seats and stems projecting toward said first chamber in sealing engagement with said sleeves inwardly of said discharge passages, means urging said valve heads inwardly toward said seats, a cam member in said first chamber between and engaging said stems for displacing said poppet valves alternately from said seats, and means connecting said first chamber to said second and third chambers at both ends of said poppet valves whereby fluid pressure may be applied to opposite ends of said poppet valves to substantially balance them.

11. A valve comprising a valve casing having substantially coaxial, communicating bores extending inwardly from opposite sides thereof, means for delivering fluid under pressure to the inner ends of said bores, means forming fluid discharge passages communicating with said bores outwardly of said fluid delivering means, a sleeve in each of said bores overlying a discharge passage and having a passage connecting the interior of said sleeve with said discharge passage, means closing the outer end of each bore and forming a chamber disposed outwardly of each sleeve, a poppet valve member slidably mounted in each sleeve, each valve member having a valve head adapted to seat against the outer end of its corresponding sleeve, means urging said valve members toward seating position, means for delivering fluid from the inner ends of said bores to said chambers, and a cam member interposed between said poppet valve members for selectively unseating the valve heads to permit fluid to flow selectively from said delivering means to one or the other of said discharge passages.

12. A valve comprising a valve casing having an inlet passage and a pair of spaced apart outlet passages, a first bore extending at least partially through said casing and communicating with said inlet passage, a second bore extending through said casing and intersecting said first bore at substantially a right angle, said second bore communicating with said discharge passages adjacent its opposite ends, tubular sleeves detachably mounted within the opposite ends of said second bore and having passages therethrough connecting the interior of each sleeve with a separate discharge passage, means closing the opposite ends of said second bore and forming chambers adjacent to the outer ends of said sleeves, poppet valves slidably mounted within said sleeves having valve heads at their outer ends and inner ends adjacent said first bore, means urging said poppet valves inwardly to seat the valve heads against the outer ends of said sleeves, means connecting said chambers with said first bore to permit fluid to flow from said inlet into said chambers to maintain substantially equal pressures on opposite ends of said poppet valves, and cam means within the said first bore engageable with the inner ends of said poppet valves for unseating said poppet valves selectively to permit fluid to flow from said chambers past the valve heads, and through the passages in said sleeves to said discharge passages.

13. A valve comprising a valve casing having an inlet passage and a pair of spaced apart outlet passages, a first bore extending at least partially through said casing and communicating with said inlet passage, a second bore extending through said casing and intersecting said first bore at substantially a right angle, said second bore communicating with said discharge passages adjacent its opposite ends, tubular sleeves detachably mounted within the opposite ends of said second bore and having passages therethrough connecting the interior of each sleeve with a separate discharge passage, means closing the opposite ends of said second bore and forming chambers adjacent to the outer ends of said sleeves, poppet valves slidably mounted within said sleeves having valve heads at their outer ends and inner ends adjacent said first bore, means urging said poppet valves inwardly to seat the valve heads against the outer ends of said sleeves, means in said sleeves connecting said chambers with said first bore to permit fluid to flow from said inlet into said chambers to maintain substantially equal pressures on opposite ends of said poppet valves, and cam means within the said first bore engageable with the inner ends of said poppet valves for unseating said poppet valves selectively to permit fluid to flow from said chambers past the valve heads, and through the passages in said sleeves to said discharge passages.

14. A valve comprising a valve casing having an inlet passage and a pair of spaced apart outlet passages, a first bore extending at least partially through said casing and communicating with said inlet passage, a second bore extending through said casing and intersecting said first bore at substantially a right angle, said second bore communicating with said discharge passages adjacent its opposite ends, tubular sleeves detachably mounted within the opposite ends of said second bore and having passages therethrough connecting the interior of each sleeve with a separate discharge passage, means closing the opposite ends of said second bore and forming chambers adjacent to the outer ends of said sleeves, tubular poppet valves slidably mounted within said sleeves having valve heads at their outer ends and inner ends adjacent said first bore, means urging said poppet valves inwardly to seat the valve heads against the outer ends of said sleeves, and cam means within the said first bore engageable with the inner ends of said poppet valves for unseating said poppet valves selectively to permit fluid to flow from said chambers past the valve heads, and through the passages in said sleeves to said discharge passages.

BENJAMIN N. ASHTON.